Dec. 12, 1944.  J. F. BALISTERI ET AL  2,364,686
AERATING DEVICE FOR FISH CONTAINERS
Filed Oct. 21, 1943
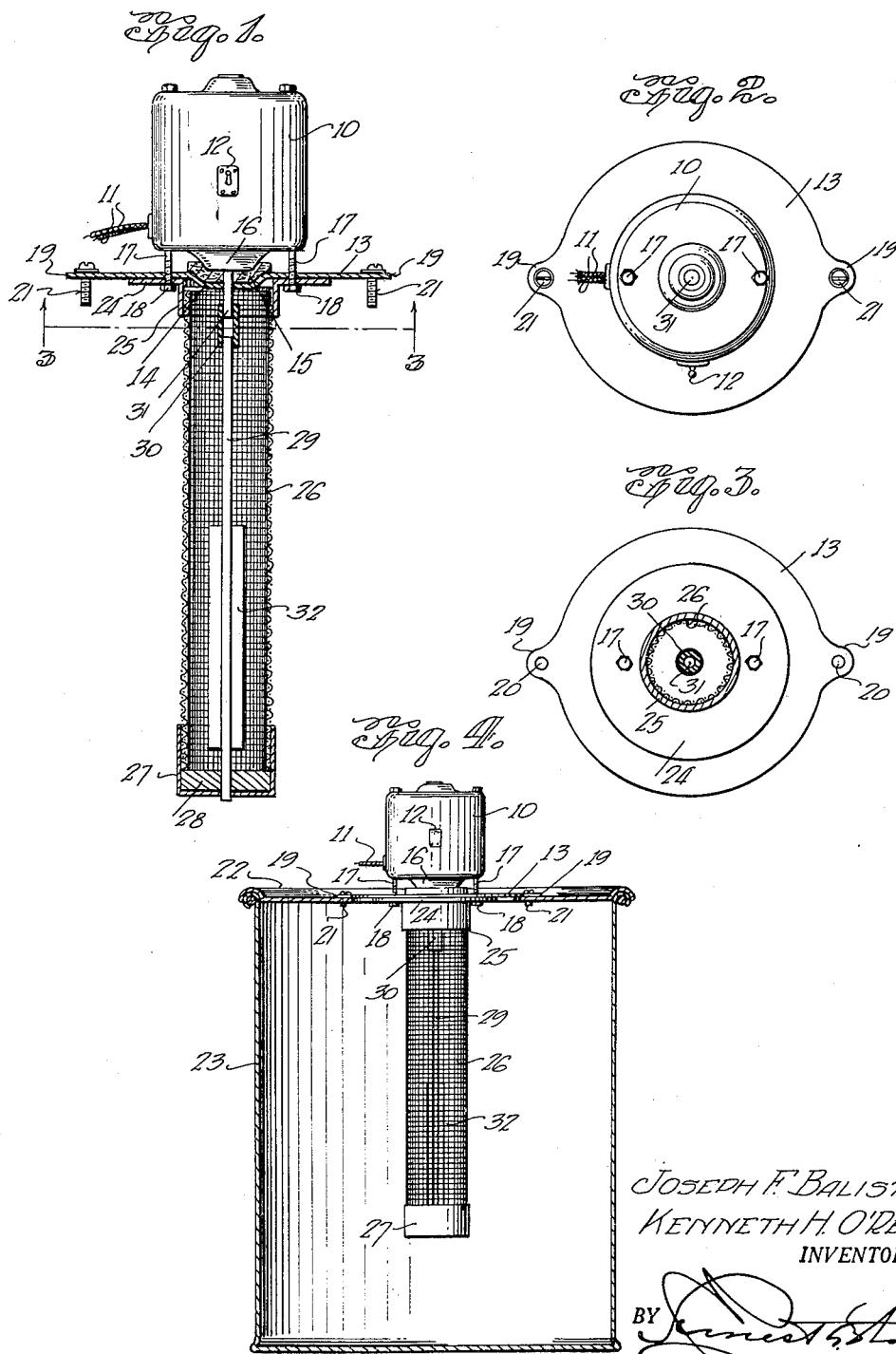
Joseph F. Balisteri
Kenneth H. O'Rear
INVENTORS
ATTORNEY Patented Dec. 12, 1944

2,364,686

UNITED STATES PATENT OFFICE 2,364,686

AERATING DEVICE FOR FISH CONTAINERS

Joseph F. Balisteri and Kenneth H. O'Rear,
Dallas, Tex.

Application October 21, 1943, Serial No. 507,094

1 Claim. (Cl. 43—57)

This invention relates to water aerating devices and it has particular reference to such a device especially adapted for live fish bait containers.

Aerating devices of various designs are known to have been used for reimpregnating water with oxygen to preserve fish, especially live bait for comparatively longer periods of time to enable fishermen to transport the fish from place to place without appreciable loss. For the most part, such devices, like the present invention, effect circulation of the water in which the fish are preserved by means of electrically actuated impellers. However, it has been found that these devices, while effective for the purpose, are somewhat involved and bulky; which discourage their use especially by casual fishermen who seek simplicity and compactness in a device of this character and desire that it be adaptable to equipment at hand.

Accordingly, the invention has for its chief object to provide an aerating device of extremely simple and compact construction, enabling it to be preserved, when not in use in a minimum of space and one which is provided with means by which it may replace the hinged cover of a conventional minnow bucket forming part of the equipment of the casual fisherman, or may be quickly attached to any type of bucket, can or other container available.

With the foregoing objects as paramount, the invention has particular reference to its salient features of construction and arrangement of parts which will become manifest as the description proceeds, taken in connection with the accompanying drawing, wherein:

Figure 1 is a side elevational view, partly in vertical section of an aerating device constructed according to the present invention.

Figure 2 is a plan view thereof.

Figure 3 is a sectional view taken on line 3—3 on Figure 1, and viewed in the direction indicated and Figure 4 is a vertical sectional view of the device on a reduced scale shown attached to a conventional minnow bucket.

Continuing with a more detailed description of the drawing, reference numeral 10 denotes the housing of a small electric motor, which latter, when the device is used for transporting live minnows, is of D. C. type to be operated from the storage battery of a vehicle by means of wires 11. A switch 12 is provided for controlling current to the motor 10.

A mounting plate 13 is provided, which has a recess 14 to receive a water-proof washer 15, the latter being adapted to conform to the recess and to the protuberance 16 of the motor housing which bears thereagainst. Bolts 17 extend through the motor housing and through the mounting plate 13 and, with the nuts 18, serve to hold the plate 13 secure on the motor.

The plate 13 has ears 19 thereon in diametrically opposed relationship, having apertures 20 therein to receive bolts 21, by which the plate 13 and consequently the device as a whole may be secured to the top of a receptacle such as the top 22 of the bucket 23, shown in Figure 4.

Soldered or otherwise secured to the underside of the mounting plate 13 is the flange 24 of a collar 25. Within this collar is secured, preferably by solder, the upper end of a foraminous cylinder or tube 26. The lower end of this tube is closed by a cap 27, except for a central aperture in the cap, aligned with an aperture in a disc-like member 28, which serves as a bearing for the lower end of a shaft 29.

The shaft 29 extends axially through the cage or foraminous tube 26 and is connected, by means of the flexible coupling 30 to the armature shaft 31 of the motor 10. Mounted upon the shaft 29 is a vane or impeller 32 of any suitable design calculated to excite or agitate the water in which the lower portion of the device is submerged.

In mounting the device on a conventional minnow bucket, such as that shown in Figure 4, it is simply necessary to remove the hinge pin of the cover and replace the latter with the flange or plate 13 and insert the bolts 21 in suitable apertures provided in diametrically opposed relation on opposite sides of the opening in the top 22 of the bucket.

It is obvious that the device may be disposed centrally in the container, as shown or at any other location about the center, depending upon the type of container available and suitable for transporting minnows. In any such position, the water will be constantly circulated when the motor 10 is operated, keeping the bait alive by renewing the oxygen content of the water.

Manifestly, the construction as shown and described is capable of some modification and such modification as may be construed to fall within the scope and meaning of the appended claim is also considered to be within the spirit and intent of the invention.

What is claimed is:

A water aerating attachment for live bait containers, comprising a motor having an armature shaft, a mounting plate having a countersunk central portion, a flanged collar under said plate, relatively parallel bolts extending axially through the housing of said motor, said plate and the flange of said collar to secure the latter rigidly to said motor, a water-proof washer compressedly held in and in conformity with the countersunk portion of said plate by an end of said motor housing and embracing said armature shaft, a foraminous tube connected to and depending from said collar on the underside of said plate, having a closed lower end, and adapted to be submerged in water in said container, a shaft disposed axially in said tube and journaled at its lower end in the lower end of said tube, means effecting flexible connection between the upper end of said shaft with said armature shaft and means carried by said axial shaft to effect circulation of water when said motor is operated.

JOSEPH F. BALISTERI.
KENNETH H. O'REAR.